May 25, 1948.  M. MALLORY  2,442,302
INTERNAL-COMBUSTION ENGINE WITH OPPOSED PISTONS
Filed Jan. 29, 1946  2 Sheets-Sheet 1
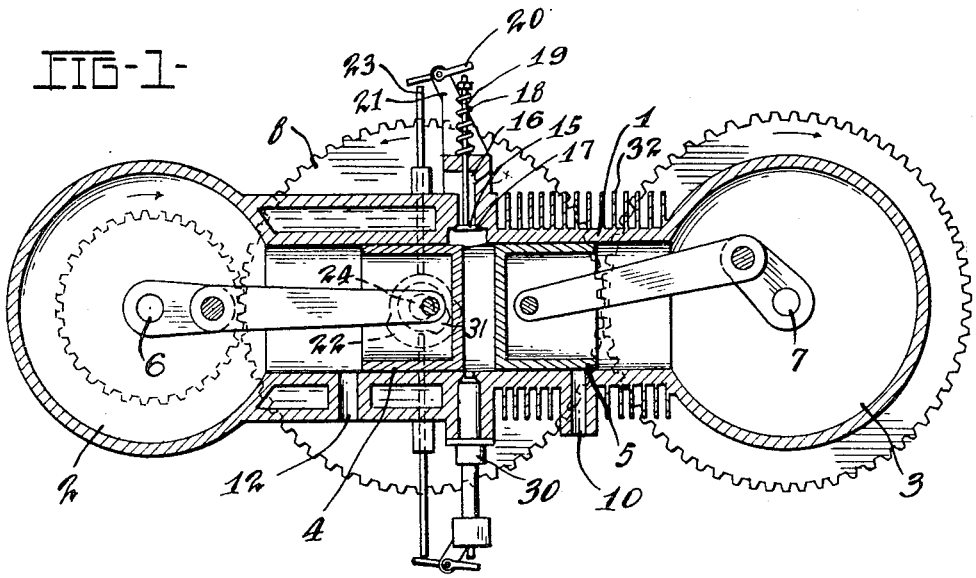
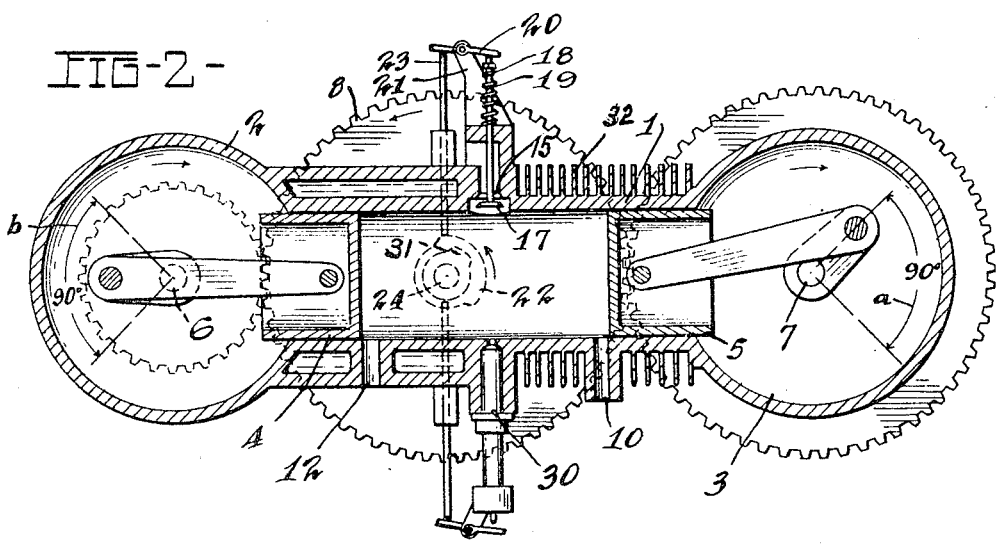
Inventor
MARION MALLORY
By Owen & Owen,
Attorneys.

May 25, 1948.  M. MALLORY  2,442,302
INTERNAL-COMBUSTION ENGINE WITH OPPOSED PISTONS
Filed Jan. 29, 1946  2 Sheets-Sheet 2
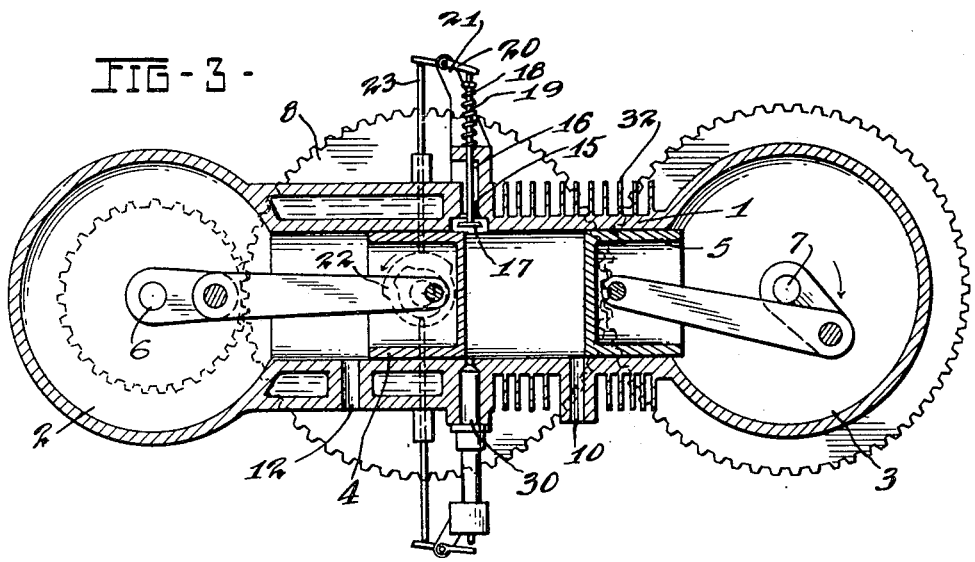
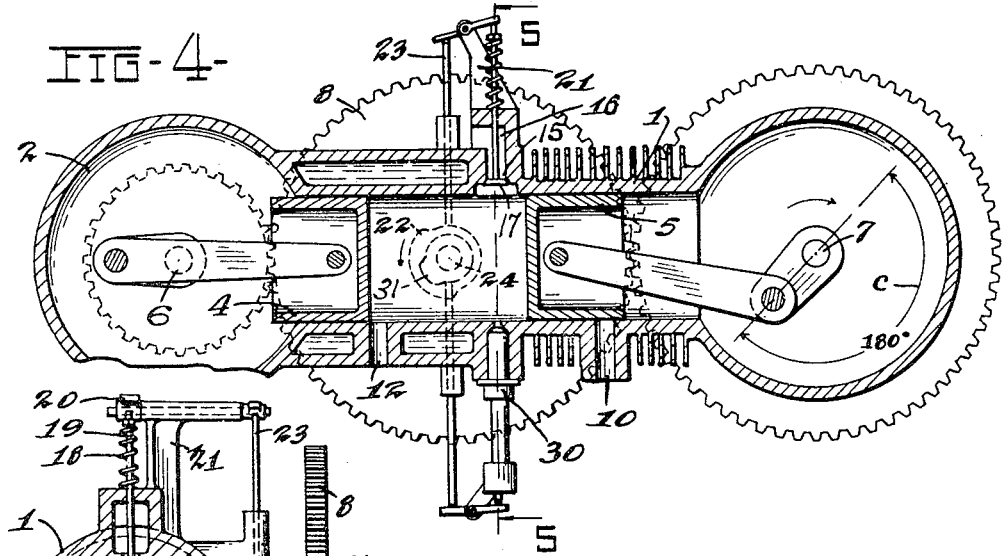
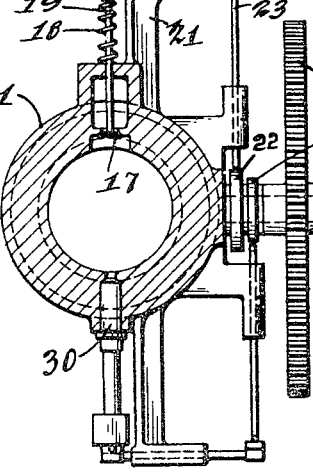
Inventor
MARION MALLORY
By Owen & Owen
Attorneys Patented May 25, 1948

2,442,302

UNITED STATES PATENT OFFICE 2,442,302

INTERNAL-COMBUSTION ENGINE WITH OPPOSED PISTONS

Marion Mallory, Detroit, Mich.

Application January 29, 1946, Serial No. 644,045

9 Claims. (Cl. 123—51)

This invention relates to internal combustion engines and method of operating same, and particularly to the type of such engines disclosed in my former Patent No. 2,345,056, dated March 28, 1944.

In such an engine, the compression and combustion of the charges take place between two pistons operating in a common cylinder and having their separate crankshafts geared together with a ratio of two-to-one, with the slower moving piston controlling an exhaust port and the faster moving piston controlling an air charge inlet port. The relative movements of the pistons in said patented engine are such that the inlet port is opened by its piston to admit scavenging air to the cylinder when the exhaust port is opened by its piston at the end of the power stroke and again in the same cycle during a compression stroke of the slow moving piston, but after a closing of the exhaust port on such stroke.

One of the objects of the present invention is to remedy this objectionable feature by controlling the air inlet port by valve means other than the piston and at the same time increasing the duration of the air admission period whereby the air charge admission will occur during approximately 180° of movement of the crankshaft for the slow moving piston, starting with the opening of the exhaust port near the end of the working stroke of the piston, and thereby materially increasing the efficiency of operation of the engine.

Another object of the invention is to further improve the running efficiency of said patented engine by maintaining relative temperatures in the compression and expansion zones of the cylinder, whereby the compression of the charges takes place in a relatively cool zone, and burning and expansion thereof take place in a relatively hot zone. In other words, the best results are obtained by effecting explosion in a relatively cool zone, thus permitting a greater and more efficient expansion of the gases than if charge was hot when ignited, and then causing the expansion to continue in a hotter zone of the cylinder. The theory of operation is that the cooler the charge when expansion or burning starts, the greater will be the range of expansion and the more efficient will be the work performed. By starting expansion in a cool zone and continuing same in a relatively hotter zone, the expansion pressures in the cylinder are maintained over a longer period or until substantially the end of the power stroke. Thus, the peak of expansion would not be of such short dwell and the pressures would remain high until the crankshaft has moved into a position where it had great turning leverage. The hot chamber would prevent rapid dissipation of the heat and in turn would prevent such rapid contraction of the expanded gases as would otherwise occur. Also by effecting compression in a cool chamber, extremely high compression, some times desirable, can be obtained without self-ignition or pre-ignition.

In an engine such as shown in said prior patent, where one of the pistons acts as a valve to control the air intake port, the air charge pressure is commonly against the side of the piston, as it passes the air inlet port, and thus tends to drive the oil off from the piston rings into the combustion chamber, thereby not only destroying necessary lubrication but increasing the oil consumption. An object of the invention is to obviate this objection.

Other objects and advantages of the invention will be apparent from the following detailed description and from the accompanying drawing showing one embodiment of the invention, in which—

Fig. 1 is a section through an engine showing the position of the parts after the completion of the compression stroke and at the beginning of the power stroke; Fig. 2 is a similar section showing the position of the parts near the end of the power stroke, or at approximately the beginning of the opening of the exhaust, and at the beginning of the opening of the air charge intake valve; Fig. 3 is a similar section showing the position of the parts at the end of the exhaust stroke of the fast moving piston and at approximately the point of closing of the main exhaust port; Fig. 4 is a similar section showing the position of the parts at the beginning of the compression stroke of the fast moving piston and at approximately the point of closing of the air intake valve, and Fig. 5 is a central cross-section on line 5—5 of Fig. 4 of the engine with parts in full.

In the drawings, 1 designates an engine cylinder the ends of which open into respective crankcases 2 and 3. Pistons 4 and 5 operate in opposite ends of the cylinder and are connected to respective crankshafts 6 and 7, the former in the case 2 and the latter in the case 3. The crankshafts are connected in any suitable manner, as by a gear train 8, to have a turning ratio of two-to-one, so that the shaft 6 makes two complete revolutions to one of the shaft 7. The relationship of the connection of the pistons with their shafts is preferably such that when the wrist pin of shaft 6 is in outer or bottom dead center position, the wrist pin connection of shaft 7 is approximately 45° short of its outer dead center position, as shown in Fig. 2.

The cylinder has an exhaust port 10 that is uncovered by the piston 5 during substantially the outer 90° movement of the wrist pin of shaft 7, which movement is approximately 45° each side of outer dead center, as indicated by the arcuate line $a$ in Fig. 2. It is also preferable but not necessary to provide at the opposite end of the cylinder an auxiliary exhaust port 12 that is uncovered by the piston 4 during substantially the outer 90° of movement of its wrist pin connection across outer dead center, as indicated by the arcuate line $b$ in Fig. 2.

The air charges are admitted to the cylinder through a centrally located port 15 and may be supplied in any suitable manner, as from a blower or pump (not shown), through a passage 16 controlled by an inwardly opening valve 17. This valve is yieldingly seated by a spring 18 acting on its stem 19 and is opened by the action of a tappet member 20, in the present instance of the rocker type, and fulcrumed to a bracket 21 on the engine casing. Rocking movements are imparted to the rocker 20 from a rotating cam 22 through a tappet rod 23. The cam 22 is geared to the crankshafts, being mounted, in the present instance, on the shaft 24 carrying the intermediate or idler gear of the train 8 and turns at the same speed as the shaft 7. The cam is arranged, and of suitable length, to actuate the tappet means to open the intake valve 17 during approximately 180° of movement of the shaft 7, starting at approximately 45° before outer dead center of such shaft and continuing to about 135° past such dead center, as indicated by the arcuate line $c$ in Fig. 4. The valve opening position of the cam is shown in Fig. 2 and its closing position is shown in Fig. 4. The arc of the lobe of this cam is, therefore, approximately 180° in length, which means that an air charge is admitted to the cylinder from the time the exhaust port 10 is opened until the pistons 4 and 5 have moved to positions shown in Fig. 4 and that during the same period the fast moving crankshaft 6 has traveled 360°, or in other words a complete turn from outer dead center position. This gives a prolonged time to charge and scavenge the cylinder before the fuel injection.

The fuel injection may be of the conventional type, including an injection nozzle 30 positioned to introduce its charge into the cylinder at its center and being operated, as for instance by a connection from a cam 31 on the shaft 24, to cause an injection of fuel to occur after the closing of both exhaust ports 10 and 12 by the respective pistons during the compression stroke of the slow moving piston 5. If desired, the fuel may be injected into the cylinder 1 through the intake valve 17 when open. Low pressure injection may be used for spark ignition or high pressure injection can be used if the engine is operating on a Diesel principle and in such latter case the injection would, of course, be delayed until the compression is approximately at its maximum. It will, of course, be understood that fuel injection, whether of Diesel or low pressure type, takes place every revolution of crankshaft 7 and every other revolution of crankshaft 6.

In the operation of the engine, the firing of a charge occurs when the pistons are in approximately the positions shown in Fig. 1, with the fast moving crankshaft at inner dead center position and the slow moving crankshaft slightly past such position. At approximately the end of the expansion or power stroke of the piston 5, with the exhaust ports uncovered, the cam 22 acts to open the air intake valve 17, so as to effect a thorough scavenging of the gases of combustion from the cylinder during a 90° movement of the crankshaft of piston 5 across outer dead center, as indicated by the arc $a$ in Fig. 2. The air intake valve continues open throughout a further 90° movement of the crankshaft 7. During the major portion of the inward stroke of the piston 5, or until the wrist pin of its crank has reached a point approximately 45° short of inner dead center, the piston 4 has completed the outstroke so that the air pressure built up in the cylinder is slight or not sufficient to overcome the charging pressure. As the piston 5 on its inward stroke, after closing the exhaust valve 10, moves toward piston 4, there will be little if any compression of the admitted air due to the movement in the same direction of piston 4 at a greater speed. At the same time the uncovering of the auxiliary exhaust port 12, if provided, will release a part of such pressure so that the major portion of the compression of the charge takes place during the last 45° movement of the slow moving piston on its outward stroke and during substantially the full compression or inward stroke of the fast moving piston 4. The injection of fuel takes place after the closing of exhaust port 10, and also of exhaust port 12 if used, and ignition takes place at or adjacent to the ends of the compression strokes of both pistons.

By introducing the air charges at the center of the cylinder and controlling them by valve means other than the piston 4, as is done by the arrangement shown in said former patent, the objectionable pressure of the air against the piston side and the resulting driving of the oil from the piston rings into the combustion chamber, as well as the consequent failure of proper lubrication, is avoided. This results in a more economical and efficient running of the engine.

In order to obtain maximum power from the expansion of gases when explosion of fuel charges occurs, it is found important to maintain the temperature of the cylinder wall at the end thereof in which compression of the charges takes place as cool as possible and at the same time to permit the other end portion of the cylinder, which may be termed the exhaust end, to run exceptionally hot. The first permits more rapid expansion of the gases as explosion takes place and consequently greater power efficiency, and the last causes the expansion pressures to be maintained for a longer duration than would otherwise be the case. For these reasons, the left or compression end of the cylinder, in the present instance, is water-jacketed to cause it to run relatively cool, while the other or exhaust end is provided with fins 30 to effect air cooling which permits such end to run much hotter than the water-cooled end.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. An internal combustion engine comprising a cylinder, opposing pistons in the cylinder, two crankshafts, connections from one crankshaft to one of said pistons and from the other crankshaft to the other piston, means connecting the crankshafts to operate in a two-to-one ratio, whereby the fast-moving piston makes two strokes to one stroke for the slow-moving piston, the cylinder having a central air intake port and an exhaust port uncovered by the slow-moving piston near the outer end of its outward stroke, a normally closed control valve for the intake port, and control means timed by the piston operation to open the control valve and admit scavenging air to the cylinder when said exhaust port is open and to continue the admission of air for a predetermined period after a closing of said exhaust port.

2. An internal combustion engine comprising a cylinder, two pistons in opposite ends of the cylinder, a separate crankshaft connected to each piston, gearing connecting the crankshafts in a two-to-one ratio, whereby the fast-moving piston makes two strokes to one for the slow-moving piston, the cylinder having a centrally located port for admitting air under pressure and an exhaust port uncovered by the slow-moving piston near the end of its outward stroke, a valve for closing the centrally located port, and means operable during the running of the engine to open the valve to admit an air charge for approximately 150° movement of the slow-moving crankshaft starting approximately 45° before outer dead center of the shaft.

3. An internal combustion engine comprising a cylinder, two pistons in opposite ends of the cylinder, a separate crankshaft connected to each piston, gearing connecting the crankshafts in a two-to-one ratio, whereby the fast-moving piston makes two strokes to one for the slow-moving piston, the cylinder having an exhaust port controlled by the slow-moving piston and an air charge admission port opening into its central portion and free from obstruction by the pistons, an inwardly opening check valve for said port, and means automatically operable to open said admission valve shortly before the slow-moving crankshaft has reached its outer dead center position in each revolution and to maintain said valve open until the piston connected to said slow-moving shaft has traversed more than half of its inward stroke.

4. An internal combustion engine comprising a cylinder, two pistons in opposite ends of the cylinder, a separate crankshaft connected to each piston, gearing connecting the crankshafts in a two-to-one ratio, whereby the fast-moving piston makes two strokes to one for the slow-moving piston, the cylinder having an exhaust port controlled by the slow-moving piston and an air charge admission port opening into its central portion and free from obstruction by the pistons, an inwardly opening check valve for said port, and means automatically operable to open said admission valve and continue it open for substantially a full revolution of the fast-moving crankshaft after the opening of the exhaust port.

5. An internal combustion engine comprising a cylinder, two pistons in opposite ends of the cylinder, a separate crankshaft connected to each piston, gearing connecting the crankshafts in a two-to-one ratio, whereby the fast-moving piston makes two strokes to one for the slow-moving piston, the cylinder having an exhaust port controlled by the slow-moving piston and an air charge admission port opening into its central portion and free from obstruction by the pistons, an inwardly opening check valve for said port, a cam driven at the same speed as the slow-moving crankshaft, and means operable by said cam to open said valve at approximately the time of opening of the exhaust port by the slow-moving piston and to continue it open during the major portion of the inward stroke of the last said piston.

6. An internal combustion engine comprising a cylinder, two pistons in opposite ends of the cylinder, a separate crankshaft connected to each piston, gearing connecting the crankshafts in a two-to-one ratio, whereby the fast-moving piston makes two strokes to one for the slow-moving piston, the cylinder having an exhaust port opened by the slow-moving piston near the end of its outer stroke, an auxiliary exhaust port opened by the fast-moving piston at substantially the outer end of its outstroke, and an inlet port opening into the central portion of the cylinder to admit charges thereto, a valve closing said port, and means automatically operable to open said valve and continue it open for substantially a full revolution of the fast-moving crankshaft after the opening of the first said exhaust port.

7. An internal combustion engine comprising a cylinder, two pistons in opposite ends of the cylinder, a separate crankshaft connected to each of said pistons, gearing connecting the shafts in a two-to-one ratio, whereby the fast-moving piston makes two strokes to one for the slow-moving piston, means timing the operation to produce the major expansion of the space between the pistons in one end portion of the cylinder during the working stroke and then continue such expansion in the other end portion, the cylinder having an exhaust port controlled by the slow-moving piston, and means to cause the cylinder wall of its last said end to run hot to maintain expansion to substantially the end of the power stroke and to cause the cylinder wall of its first said end to run comparatively cool.

8. An internal combustion engine comprising a cylinder, two pistons in opposite ends of the cylinder, a separate crankshaft connected to each of said pistons, gearing connecting the shafts in a two-to-one ratio, whereby the fast-moving piston makes two strokes to one for the slow-moving piston, means timing the operation to produce the major expansion of the space between the pistons in one end portion of the cylinder during the working stroke and then continue such expansion in the other end portion, the cylinder having an exhaust port controlled by the slow-moving piston, and separate cooling means for the said end portions, one acting to permit quite a high temperature in the end portion where the latter part of said expansion occurs and the other cooling means keeping the first said portion relatively cool.

9. An internal combustion engine comprising a cylinder, two pistons in opposite ends of the cylinder, a separate crankshaft connected to each of said pistons, gearing connecting the shafts in a two-to-one ratio, whereby the fast-moving piston makes two strokes to one for the slow-moving piston, means timing the operation to produce the major expansion of the space between the pistons in one end portion of the cylinder during the working stroke and then continue such expansion in the other end portion, the cylinder having an exhaust port controlled by the slow-moving piston, and means to cool the first said end portion more than the last said end portion is cooled.

MARION MALLORY.

REFERENCES CITED

The following references are of record in the file of this patent:

UNITED STATES PATENTS

| Number | Name | Date |
|---|---|---|
| 670,966 | Pender | Apr. 2, 1901 |
| 1,237,696 | Rayl | Aug. 21, 1917 |
| 1,324,534 | Ambrose | Dec. 9, 1919 |
| 1,578,476 | Slaght | Mar. 30, 1926 |
| 1,613,116 | Michell | Jan. 4, 1927 |

FOREIGN PATENTS

| Number | Country | Date |
|---|---|---|
| 216,209 | England | 1924 |